(12) United States Patent
Bailey et al.

(10) Patent No.: US 9,641,404 B1
(45) Date of Patent: May 2, 2017

(54) METHODS, SYSTEMS, AND COMPUTER READABLE MEDIUM FOR DYNAMIC, POLICY-BASED ALLOCATION OF SYSTEM RESOURCES

(71) Applicant: EMC Corporation, Hopkinton, MA (US)

(72) Inventors: Charles Christopher Bailey, Cary, NC (US); Jason L. Taylor, Apex, NC (US); Samuel L. Mullis, II, Raleigh, NC (US); Miles Aram DeForest, Bahama, NC (US); Jackson Brandon Myers, Cary, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 162 days.

(21) Appl. No.: 14/632,036

(22) Filed: Feb. 26, 2015

(51) Int. Cl.
*G06F 12/00* (2006.01)
*H04L 12/24* (2006.01)
*H04L 29/08* (2006.01)
*G06F 13/00* (2006.01)

(52) U.S. Cl.
CPC ......... *H04L 41/5054* (2013.01); *H04L 67/10* (2013.01)

(58) Field of Classification Search
CPC .... G06F 3/0631; G06F 3/0644; G06F 3/0689; G06F 3/0605; G06F 3/061; G06F 3/0625; G06F 3/064; G06F 3/0647; G06F 3/0685; G06F 13/28; Y02B 60/1228; Y02B 60/1246; H04L 41/5054; H04L 67/10
USPC ......... 709/226; 711/114, 170, 100, 111, 112, 711/147, 148, 154, 156, 165, 173; 718/104
See application file for complete search history.

(56) References Cited

U.S. PATENT DOCUMENTS

| | | | | | |
|---|---|---|---|---|---|
| 6,125,394 | A  * | 9/2000 | Rabinovich | ............ | H04L 29/06 709/220 |
| 6,880,062 | B1 * | 4/2005 | Ibrahim | ............. | H04L 67/1097 709/216 |
| 7,281,105 | B1 * | 10/2007 | Wang | ..................... | G06F 3/061 711/112 |
| 7,334,092 | B1 * | 2/2008 | Wang | ..................... | G06F 3/061 711/112 |
| 7,480,912 | B2 * | 1/2009 | Arnold | ................. | G06F 9/5016 711/111 |
| 8,443,163 | B1 * | 5/2013 | Bailey | .................. | G06F 3/0605 711/114 |
| 8,443,369 | B1 * | 5/2013 | Bailey | .................. | G06F 3/0631 718/104 |
| 8,583,838 | B1 * | 11/2013 | Marshak | ................ | G06F 3/061 710/16 |

(Continued)

*Primary Examiner* — Alina N Boutah
(74) *Attorney, Agent, or Firm* — Krishnendu Gupta; Jason A. Reyes (57) ABSTRACT

Systems, methods, and computer readable medium for optimizing storage allocations based on system resources are disclosed. According to one aspect, the subject matter described herein includes a method for dynamic, policy-based allocation of system resources. The method includes maintaining statistics in connection with like system resources. Each of the system resources having associated statistics that are suitable for describing a relationship with an allocatable class of resource. A request is received for a resource. In response to receiving the request, one of the like system resources is selected, based on the statistics and a policy, as a best system resource in connection with the allocatable class of resource.

14 Claims, 3 Drawing Sheets

(56) References Cited

U.S. PATENT DOCUMENTS

| | | | | |
|---|---|---|---|---|
| 8,886,909 B1* | 11/2014 | De Forest | ............... | G06F 3/061 |
| | | | | 711/100 |
| 2009/0064159 A1* | 3/2009 | LaFrese | ................ | G06F 3/0613 |
| | | | | 718/104 |
| 2014/0317265 A1* | 10/2014 | James | ................. | H04L 67/1004 |
| | | | | 709/224 |
| 2015/0106813 A1* | 4/2015 | Mihalocivi | ........... | H04L 47/125 |
| | | | | 718/1 |

* cited by examiner

METHODS, SYSTEMS, AND COMPUTER READABLE MEDIUM FOR DYNAMIC, POLICY-BASED ALLOCATION OF SYSTEM RESOURCES

TECHNICAL FIELD

The subject matter described herein relates to the intelligent allocation of finite system resources. More particularly, the subject matter described herein relates to methods, systems, and computer readable medium for dynamic, policy-based allocation of system resources.

BACKGROUND OF THE INVENTION

Systems that manage large numbers or amounts of resources often must impose organizational structures onto the collection of resources in order to manage the collection in a rational way. Preferably, the organization is along natural boundaries that consider real, physical characteristics and constraints of the collection and its individual components. The difficulties of managing large and complex collections of resources may be mitigated via the use of high level abstractions to represent, in simplified form, certain aspects of the system, the collections or resources, and the organization imposed thereon.

A large data storage array is an illustrative example. A traditional storage array (herein also referred to as a "disk storage array", "disk array", or simply "array") is a collection of storage entities, such as hard disk drives, solid state drives, tape drives, or other entities used to store information (for simplicity, hereinafter referred to as "disks"), operating together logically as a unified storage device. A storage array may be thought of as a system for managing a large amount of a resource, i.e., a large number of disk sectors. Management of the resource may include allocation of a portion of the resource in response to allocation requests. In the storage array example, portions of the storage array may be allocated to, i.e., exclusively used by, entities that request such allocation. One issue that may be considered during allocation of a resource is the selection process—namely, how to determine which unallocated portion of the collection of resources is to be allocated to the requesting entity.

Conventional allocation methods fall into two categories: allocation methods that use naive algorithms, i.e., algorithms that do not consider the organization or underlying characteristics and constraints of the resources, and allocation methods that use ad hoc algorithms, i.e., algorithms that are designed for a particular end or case at hand without consideration of the wider application. Both types of algorithms have disadvantages: because naive algorithms don't consider the current use of resources, they tend to make inefficient use of those resources, while ad hoc algorithms are usually rigid and inflexible, and tend to be hard-coded, making them difficult to modify. Using the storage array example above, a naive algorithm may simply allocate a portion of the storage array without considering bus, RAID group, or LU capacity. An ad hoc algorithm may consider these parameters, but the algorithm must be customized for the particulars of the resources to be managed, and once defined, may not be subsequently modified.

Accordingly, there exists a need to manage system resources in a non-naive manner, but without the rigidity of conventional ad hoc implementations. Specifically, there exists a need for methods, systems, and computer readable medium for dynamic, policy-based allocation of system resources.

SUMMARY OF THE INVENTION

There is disclosed a method, comprising: maintaining statistics in connection with like system resources, wherein the statistics associated with each system resource are suitable for describing a relationship with an allocatable class of resource; receiving a request for a resource; and in response to receiving the request, selecting, based on the statistics and a policy, one of the like system resources as a best system resource in connection with the allocatable class of resource.

There is also disclosed a system, comprising: at least one processing device, said at least one processing device comprising a processor coupled to a memory; wherein the system is configured to: maintain statistics in connection with like system resources, wherein the statistics associated with each system resource are suitable for describing a relationship with an allocatable class of resource; receive a request for a resource; and in response to receiving the request, select, based on the statistics and a policy, one of the like system resources as a best system resource in connection with the allocatable class of resource.

There is further disclosed a computer readable medium having stored thereon computer executable instructions that when executed by a processor of a computer perform steps comprising: maintaining statistics in connection with like system resources, wherein the statistics associated with each system resource are suitable for describing a relationship with an allocatable class of resource; receiving a request for a resource; and in response to receiving the request, selecting, based on the statistics and a policy, one of the like system resources as a best system resource in connection with the allocatable class of resource.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

As will be known, a storage array is a collection of hard disk drives operating together logically as a unified storage device. Storage arrays typically include a pool of storage devices organized into multiple RAID groups with each RAID group further divided into a number of logical units or LUs. Each LU generally comprises one or more contiguous slices of storage space on a physical device.

It should be noted that the placement of such slices in a storage pool can be important when attempting to meet policy goals such as maximizing performance. One approach to optimizing the placement of slices is to balance the allocation of slices across buses, RAID groups, LUs, etc. However, this approach can sometimes lead to non-optimal results as a consequence of the order in which the slices are allocated. For example, if "performance critical" slices are allocated every third slice when slice allocation occurs across three RAID groups in a round-robin manner, the result can be that the "performance critical" slices end up on the same RAID group causing performance issues due to the "performance critical" slices being bottled-necked on the same RAID group. The performance issues may be caused despite the fact that the sum total of the slices may be balanced across the RAID groups.

The subject matter described herein can solve this problem by providing slice classes that can be balanced in isolation to the rest of the slices classes. In at least one embodiment, class-based statistics and non-class statistics are maintained in connection with system resources in a pool. For example, class resource allocation statistics and total non-class resource allocation statistics are maintained in connection with each of the system resources in the pool. It should, therefore, be appreciated that if, for example, a class A slice is allocated, it will be necessary to adjust the class A resource allocation statistics (i.e., increase class A allocation, decrease available slices) and the total non-class resource allocation statistics (i.e., increase allocated slices, decrease available slices). This facilitates asking for the best slice for a particular slice class or an entire pool via the same interfaces.

It should be noted, however, that a potential problem with the solution in the previous paragraph is that it can allow allocation of slices of a particular class to put the rest of the pool in an unbalanced state. As a result, the notion of adjustment by a pre-determined amount (e.g., boost) is introduced. Accordingly, each class can have a specific boost value specified (e.g., as a percentage) essentially indicating how much more important the class selection is than the optimal pool-level choice. For instance, if allocation of the best slice for a class A slice would put the rest of the pool in a very unbalanced state, the class A selection can be overridden and a pool-level selection can be used.

It should also be noted that another potential problem with the above solution is the possibility of degenerate slice allocation ordering within the same slice class. This can be avoided, for clients that care, by allowing the client to specify a preferred value for part of the slice. For example, the client can specify which resource that it prefers to have, such as, specifying the RAID group wanted, but it could also be extended to allow the client to specify any other detail desired. The requested resource, along with its boost, can then be compared with the pool-level selection in order to make an optimal decision.

Figure 1A:
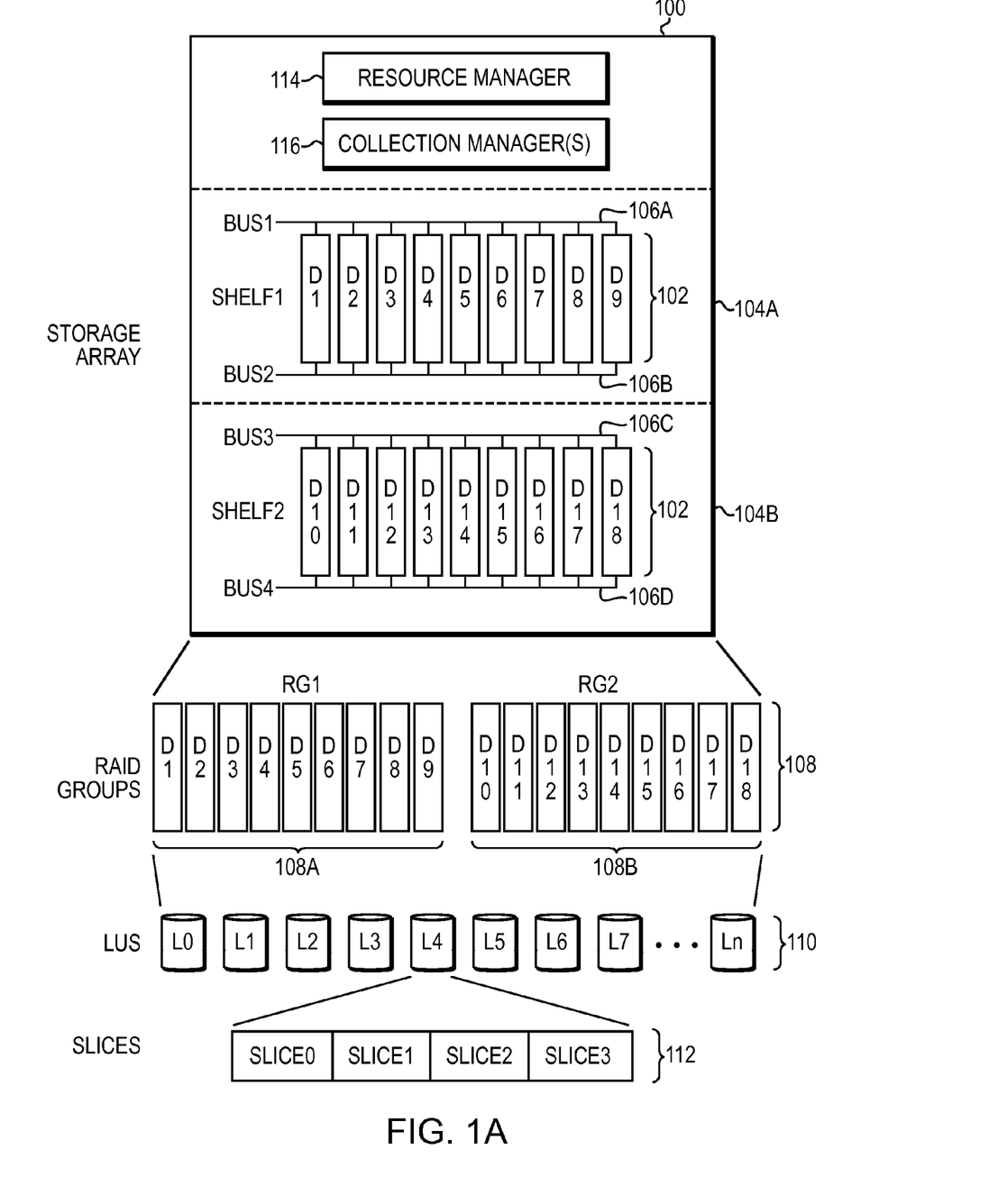
FIG. 1A is a block diagram illustrating an exemplary system for dynamic, policy-based allocation of system resources according to an embodiment of the subject matter described herein.

FIG. 1A is a block diagram illustrating an exemplary system for dynamic, policy-based allocation of system resources according to an embodiment of the subject matter described herein. The embodiment illustrated in FIG. 1A is a data storage array, but management of other kinds of systems or system resources is also within the scope of the subject matter claimed.

Although the atomic unit of resource being allocated may be a single disk sector, for example, the collective resource known as the "storage array" may be organized into a hierarchical set of collections: disks may be logically and/or electrically divided into "disks that are connected to one bus" and "disks that are connected to another bus"; disks may be grouped into RAID (redundant array of inexpensive disks) groups; RAID groups may be divided into logical units, or LUs; LUs may be subdivided into units or portions, hereinafter referred to as "slices"; slices may be subdivided also, and so on. If the system is designed such that each disk is connected to only one bus, and each bus is managed by a separate processor, for example, the natural boundary of physical connection to one bus or another dictates that the organizational structure of a RAID group be constrained to one bus, e.g., that a RAID group cannot span multiple buses. The organizational structure of an LU may be similarly constrained, e.g., that an LU cannot span multiple RAID groups. In this example, the high level abstraction of a RAID group allows a collection of individual disks to be treated as a single, large disk, an abstraction that simplifies management of that collection of disks.

Storage array 100 includes multiple storage devices 102, which are typically hard disk drives, but which may be tape drives, flash memory, flash drives, other solid state drives, or some combination of the above. In one embodiment, the storage devices may be organized into multiple shelves 104, each shelf containing multiple devices 102. In the embodiment illustrated in FIG. 1A, storage array 100 includes two shelves, Shelf1 104A and Shelf2 104B; Shelf1 104A contains nine storage devices, D1-D9, and Shelf2 also contains nine storage devices, D10-D18. In one embodiment, each storage device 102 may be connected to one or more buses 106. In the embodiment illustrated in FIG. 1A, each shelf 104 has two buses 106 which connect to every device 102 on that shelf 104. For example, Shelf1 104A has two buses, Bus1 106A and Bus2 106B, both of which are connected to devices D1-D9. Similarly, Shelf2 104B has two buses, Bus3 106C and Bus4 106D, both of which are connected to devices D10-D18. The configuration of storage array 100 as illustrated in FIG. 1A is for illustrative purposes only, and is not to be considered a limitation of the subject matter described herein.

In addition to the physical configuration, storage devices 102 may also be logically configured. For example, multiple storage devices 102 may be organized into RAID groups or RGs 108, shown in FIG. 1A as RG1 108A and RG2 108B. Storage devices D1-D9 are organized into a first RAID group, RG1 108A, while storage devices D10-D18 are organized into a second RAID group, RG2 108B. In one embodiment, a RAID group may span multiple shelves and/or multiple buses. Although RAID groups are composed of multiple storage devices, a RAID group may be conceptually treated as if it were a single storage device.

As used herein, the term "storage entity" may refer to either a single storage device or a RAID group operating as a single storage device. Storage entities may be further sub-divided into logical units. A single RAID group or individual storage device may contain one or more logical units (LUs) 110. In the embodiment illustrated in FIG. 1A, RAID groups 108 have been collectively subdivided into multiple LUs 110, L0 through Ln. For example, RG1 108A may have been divided into LUs L0-L6 while RG2 108B may have been divided into LUs L7-Ln. Each logical unit 110 may be further subdivided into portions of a logical unit, referred to as "slices" 112. In the embodiment illustrated in FIG. 1A, L4 has been divided into four slices 112, SLICE0-SLICE3.

As described above, depending upon the physical characteristics of the system, the collections of resources may have physical, electrical, or logical constraints on their use. Using the embodiment illustrated in FIG. 1A, for example, a RAID group 108 may span more than one shelf 104 if the RAID controller is connected to at least one bus 106 on both shelves 104; if the RAID controller is associated with only one bus 106, or with buses 106 of only one shelf 104, a RAID group 108 cannot span multiple shelves 104. Similarly, an LU 110 may or may not span multiple storage entities, depending on the configuration of storage array 100.

As this example illustrates, system resources can be organized into collections: array 100 contains a collection of shelves 104; each shelf 104 contains a collection of buses 106 and storage entities 102; each bus 106 is connected to a collection of storage entities 102; each storage entity 102 contains a collection of LUs 110; and each LU 110 contains a collection of slices 112. Each collection of resources may have an association with other collections of resources: for example, each shelf is associated with specific buses and specific devices. If these collections, the relationships between collections, and the constraints associated with the collections and relationships, can be described in a generic way, then it is possible to provide a resource manager 114 that allocates and manages resources in a non-naive, dynamic manner without the rigidity of ad hoc implementations. In one embodiment, array 100 may include one or more collection managers 116, which are responsible for managing collections of resources, and which interact with resource manager 114 to provide services to or perform functions on behalf of resource manager 114.

Figure 1B:
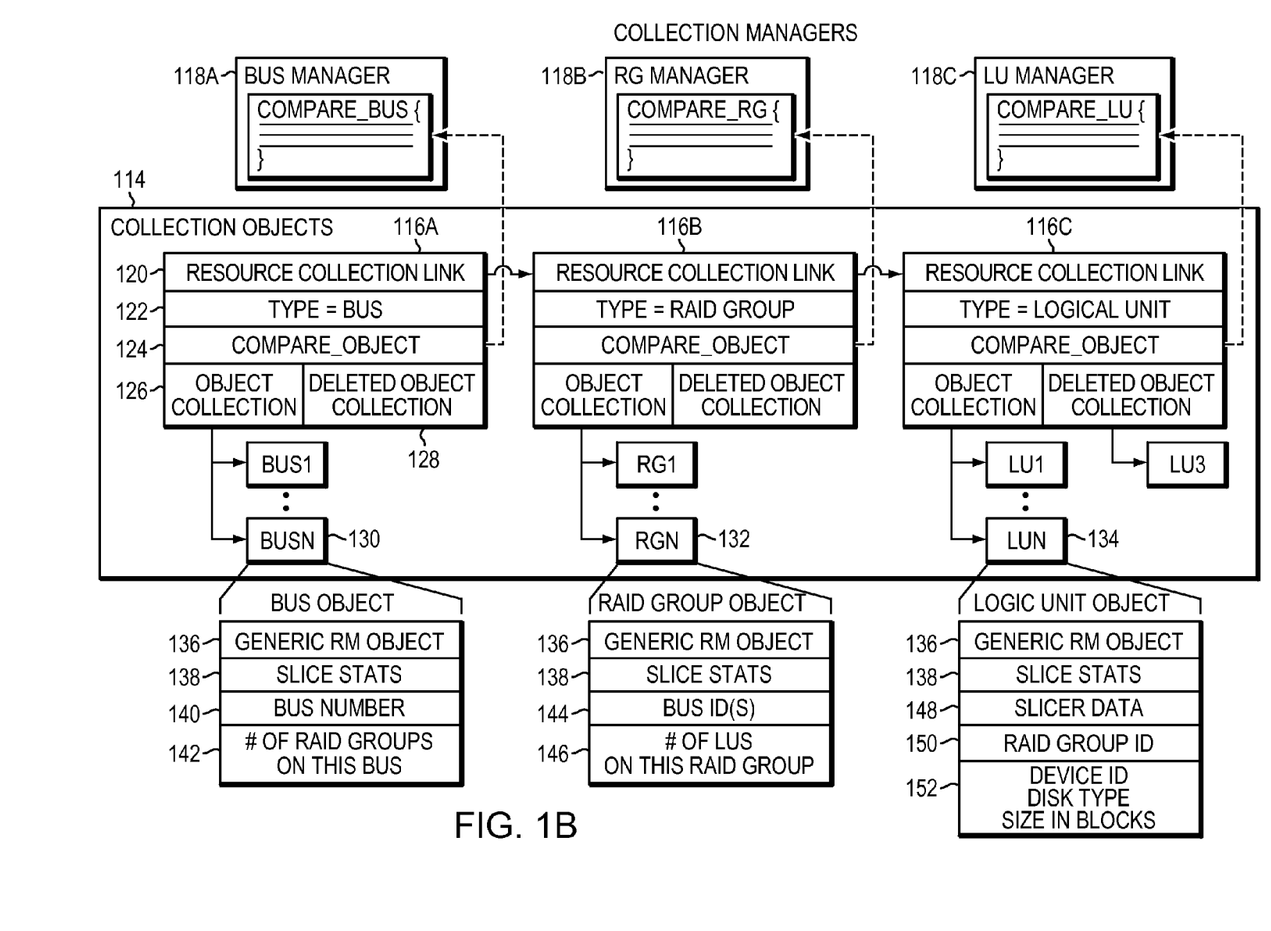
FIG. 1B is a block diagram illustrating an exemplary resource manager for dynamic, policy-based allocation of system resources according to an embodiment of the subject matter described herein.

FIG. 1B is a block diagram illustrating an exemplary resource manager for dynamic, policy-based allocation of system resources according to an embodiment of the subject matter described herein. In one embodiment, clients of resource manager 114 may create any number of generic collections of resources, e.g., sets of similar objects, and specify the order in which the collections will be accessed. The order specified may connote a dependency or other relationship between one type of resource and another type of resource. In the embodiment illustrated in FIG. 1B, resource manager 114 makes use of at least one generic data object, resource collection object 118, for representing a collection of resources.

Each collection object 118 may include a resource-manager-defined set of generic interfaces. Although the interfaces are predefined by the resource manager, the operations performed by each interface are defined by a collection manager 116 for managing a particular type of resource object. For example, resource manager 114 may require that each resource collection object 118 include an interface called "COMPARE_OBJECT", which resource manager 114 uses to compare two resources in the collection (or, more specifically, to compare two resource objects representing those two resources). However, how the comparison is performed and what standards are used to determine which is the better object, is controlled by collection manager 116, not by resource manager 118. By defining the collections of resources in a generic way, resource manager 114 is not required to know the details of any collection in order to select a resource. Instead, resource manager 114 need only walk through the collection objects 118, using collection object 118 interfaces to select from among the individual members of each collection. The same principle applies to perform other operations. For example, each collection manager 116 may be responsible for creating a new resource object at the request of resource manager 114. In that scenario, collection object 118 may include an additional interface, such as a CREATE_OBJECT interface, which invokes an appropriate function within the respective collection manager 116. For example, a CREATE_OBJECT interface on RAID group collection object 118B may invoke a CREATE_RG function within RAID group collection manager 116B.

In one embodiment, the collection objects 118 may be organized as a linked list, where the order of the objects in the list determines the order that resource manager 114 analyzes the respective collections, which may also represent or determine the relative priorities of the objects in the selection process. For example, in the embodiment illustrated in FIG. 1B, there are three collections of resources: buses, RAID groups, and logical units. Each collection object 118 contains a pointer, called a resource collection link 120, to the next collection object 118. Thus, resource manager 114 may walk through the bus, RAID group, and logical unit collection objects 118 in order, and in this manner first select a bus, then select a RAID group that occupies the selected bus, then select a logical unit from the selected RAID group.

In one embodiment, the results of the selection of one resource will influence the subsequent selection: once a bus is selected, all RAID groups that occupy other buses may be disqualified or excluded from the subsequent RAID group selection process. Similarly, once a RAID group is selected, all logical units that occupy other RAID groups may be disqualified or excluded from the logical unit selection process.

In one embodiment, the collection object 118 may include a type indicator 122 (e.g., type=bus) for identifying the type of resource represented by the collection object; a COMPARE_OBJECT 124 interface, which is a mechanism for comparing objects in the collection; and a collection of created objects 126. Collection object 118 may include a collection of deleted objects 128, used to store objects marked for eventual deletion or destruction but whose deletion is pending because the object is still referenced by another object. For example, a RAID group may be decommissioned by the storage array administrator, but the RAID group object cannot be deleted until all logical units within the RAID group are decommissioned. In that scenario, the decommissioned RAID group object would be placed into the collection of deleted objects 128.

In one embodiment, the collections of created and/or deleted objects associated with collection object 118 may be organized as a table, a linked list, or other data structures and relationships known in the art. In the embodiment illustrated in FIG. 1B, bus collection object 118A maintains a list of bus objects 130, RAID group collection object 118B maintains a list of RAID group objects 132, and logical unit collection object 118C maintains a list of logical unit objects 134.

Each resource in a collection may be represented by a resource object. In one embodiment, each resource object in a resource collection must be, at least in some aspect, the same as all other resource objects in the same collection as well as all resource objects in other collections. This may be done by defining a generic object data structure common to all resource objects. In one embodiment, each resource object contains an object type for identifying the type of resource represented by the resource object. A resource object may include a resource object identifier, a resource identifier, and a reference associating the resource object to one or more resource collections.

In the embodiment illustrated in FIGS. 1A and 1B, the resources to be allocated are slices of the storage array. Slices are portions of logical units, logical units are portions of RAID groups, and RAID groups occupy one or more buses. Thus, in this example, there are three types of resource objects: bus objects 130, RAID group objects 132, and logical unit objects 134. In one embodiment, each resource object may include a header 136 identifying the data structure as a generic resource manager (RM) object and slice statistics 138 indicating how many total slices exist within that resource, how many of the total slices are allocated, the class associated with the slice, etc. In alternative embodiments, slice statistics 138 may be data stored within the resource object, a pointer to slice statistics stored elsewhere, or a function call to a slice statistics manager that provides this information, for example.

Each resource object may also include information pertinent only to that type of resource. For example, bus object 130 may include bus number 140, and information indicating the number of raid groups on the bus 142. RAID group object 132 may include information indicating which bus or buses the RAID group occupies and the number of logical units within the RAID group. Logical unit object 134 may include slice information 148, such as a slice allocation table (SAT); RAID group ID 150; and device information 152, such as device ID, disk type, size in blocks, etc.

The order that the resource collections are to be analyzed and the determination of what makes the "best" slice to be selected may be dictated by the particular policy implemented by the client. The policy determines the selection process, and the selection process implements the policy.

For example, a "low power" policy may seek to allocate slices only from one storage entity until that storage entity is fully utilized before allocating slices from another storage entity, to reduce power consumption. Under this policy, a bus that is connected to devices that already have slice allocations, and thus bus traffic, is a "better" selection than a bus that has no traffic. Similarly, a RAID group currently in use but not yet filled to capacity is preferred over a RAID group currently not in use.

Alternatively, in a "high performance" policy, the client may desire to maximize throughput by evenly distributing slices across all physical disks in a disk storage array. Under this policy, an empty bus will be selected over a bus currently bearing traffic, and an RAID group from which no slices have been allocated will be preferred over a RAID group already containing allocated slices.

Thus, COMPARE_OBJECT 124 interfaces for logical unit, RAID group, and bus may return different results when implementing a high performance policy than when implementing a low power policy. The resource selected is the "best" resource according to the policy implemented. Example implementations of these two policies are disclosed in commonly assigned U.S. Pat. No. 8,886,909 and commonly assigned U.S. Pat. No. 8,443,369, the disclosures of which are incorporated by reference herein in their entirety. In one embodiment, the policy is considered by collection managers 116. For example, the COMPARE_LU function within logical unit collection manager 116C may include, make reference to, or have passed in as an argument a policy indicator.

Having collection managers 116 define the compare functions provides several benefits: the implementation of resource manager 114 may be simplified; additional resource types may be easily added for consideration by resource manager 114 without having to modify resource manager 114; and the determination of what makes a best resource for selection may be changed, also without having to modify resource manager 114.

Figure 2:
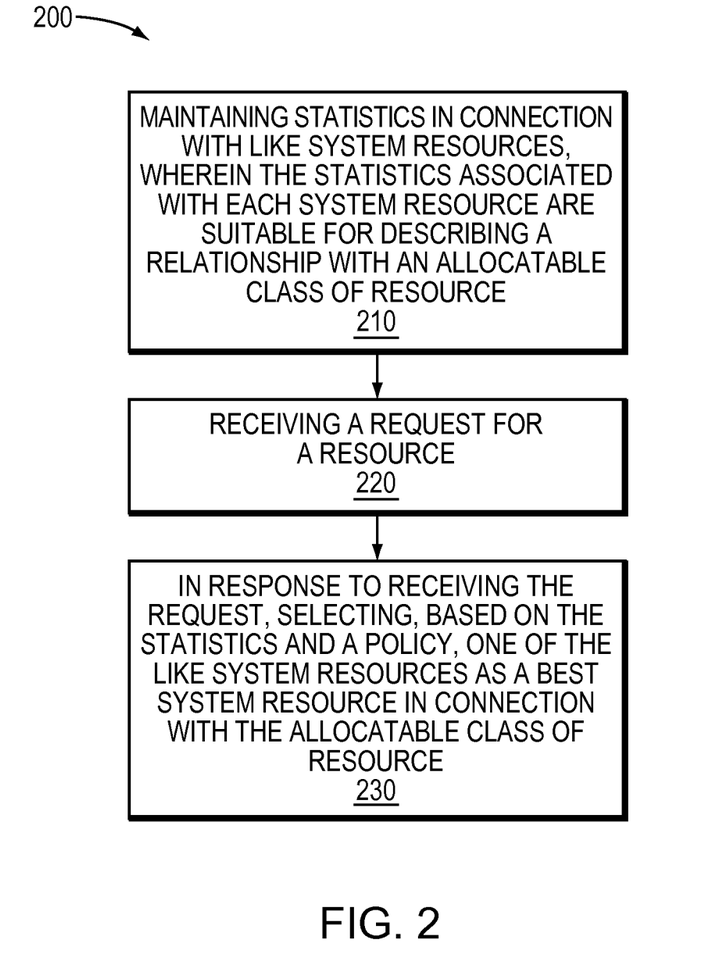
FIG. 2 is a flow chart illustrating an exemplary process for dynamic, policy-based allocation of system resources according to an embodiment of the subject matter described herein.

FIG. 2 is a flow chart illustrating an exemplary process 200 for dynamic, policy-based allocation of system resources according to an embodiment of the subject matter described herein. This process will herein be described with reference to FIGS. 1A, 1B, and 2.

At block 210, statistics in connection with like system resources are maintained. Each system resource having statistics associated therewith suitable for describing a relationship with an allocatable class of resource. In this particular embodiment, slices can be allocated that belong to different pre-defined classes. For example, class A slices (e.g., data slices) and class B slices (e.g., metadata slices) can be allocated. Thus, the statistics 138 as maintained by respective resource objects comprise a class resource allocation in connection with the system resource. The class resource allocation may describe the amount of free or allocated slices associated with each predefined slice class in connection the system resources.

In the embodiment illustrated in FIG. 1A, bus object 130, RAID group object 132, and logical unit object 134 each maintain statistics 138. For example, bus object 130 may keep track of the class resource allocation such as the total amount of class slices that have been allocated from storage entities that are connected to each bus. Similarly, RAID group object 132 may keep track of a total amount of class slices that it contains, the amount of class slices that have been allocated, the amount of class slices that are unallocated, and so on. In one embodiment, RAID group object 132 may keep track of the buses to which the RAID group has physically connected or logically associated. Logic unit object 134 may also include class slice statistics.

In this particular embodiment, the slice statistics 138 as maintained by the respective resource objects also comprises a total resource allocation that describes the total non-class resource allocation in connection with the system resources. It should be understood that the total resource allocation does not distinguish between classes and describes the total amount of free or allocated slices in connection with the system resources. In this particular embodiment, the bus object 130, RAID group object 132, and logical unit object 134 each keep track of the total amount of allocated or free slices associated therewith.

At block 220, a request for a resource is received. In the embodiment illustrated in FIG. 1A, storage array 100 may receive a request from a requesting entity, such as a host, that a slice 112 or other portion of data storage be allocated to the requesting entity.

At block 230, in response to receiving the request, one of the system resources is selected as a best system resource in connection with the allocatable class of resource. In this particular embodiment, the selection of the best system resource is based on the statistics and a policy.

In at least one embodiment, the process for selecting the best system resource in connection with a particular slice class may start upon receiving an allocation request. The process may then proceed to the highest priority or first resource collection in a linked list of resource collections. The process then determines if there are two or more like resource objects in the collection. If not, the process selects the one resource object in the collection as the best system resource and goes to the next resource collection. If multiple resource objects, the process performs a comparison operation that compares the multiple resources in the collection in order to select one of them as a best system resource in connection with the particular slice class.

The comparison operation starts by performing a first evaluation of the class resource allocation in connection with each system resource in the collection. As discussed above, the class resource allocation is suitable to describe the amount of free or allocated class slices in connection with system resources in the collection. The comparison operation may select a first system resource based on the said first evaluation of the class resource allocation and a policy. For example, it should be appreciated that a performance policy may seek to evenly distribute slices across all physical disks in a disk array. Thus, the selected first resource may be the resource with the least amount of allocated slices associated therewith.

The comparison operation also performs a second evaluation of the total resource allocation in connection with each system resource. As also discussed above, the total resource allocation comprises the total non-class resource allocation in connection with the system resources. The comparison operation may select a second system resource based on the said second evaluation of the total resource allocation and the policy. Similar to above, if the performance policy is deployed, the selected second resource may be the resource with the least amount of allocated slices associated therewith.

The comparison operation also determines a first value in connection with the first system resource based on the total resource allocation. For example, the first value may represent a percentage of allocated slices with respect to total allocatable slices in connection with the first system resource. The comparison operation also determines a second value in connection with the second system resource based on the total resource allocation. For example, the second value may represent a percentage of allocated slices with respect to total allocatable slices in connection with the second system resource.

The comparison operation also adjusts the first value by a pre-determined amount (e.g., boost) to produce an adjusted value. It should be understood that the adjustment is based on the policy. For example, if the performance policy is deployed, the first value may be adjusted downward so as to make the adjustment favorable with respect to the specified policy. The comparison operation proceeds to then compare the adjusted value and the second value. The operation finally selects the best system resource in connection with the allocatable class of resource based on the said comparison and the policy. It should be understood that if the performance policy is deployed, and the comparison indicates that the adjusted value is still greater than the second value, then the second resource is selected as the best resource in connection with the slice class. If the comparison indicates that the adjusted value is less than the second value, then the first resource is selected as the best resource in connection with the slice class.

Once the best system resource has been selected in connection with the slice class, the selection process goes to the next resource collection, and excludes from consideration all objects that are not associated with the selected resource. This process of selecting the best resource object repeats itself until all collections have been processed.

The below are two examples of the comparison operation for comparing two system resources.

Example 1

| | Class Resource Allocation Statistics | | | Total Resource AllocationStatistics | |
|---|---|---|---|---|---|
| Resource 1 | Class A | 1 | Allocated | 86 |
| | Class B | 85 | Free | 14 |
| Resource 2 | Class A | 0 | Allocated | 99 |
| | Class B | 99 | Free | 1 |
| | Free | 1 | | |

In this example, a best system resource is required to be selected in connection with a Class A slice. Further, a performance policy is deployed.

Pick a slice based on the class statistics: Resource 2 has 0 Class A statistics and Resource 1 has 1 so Resource 2 is picked as it has the least allocated class A slices. It should be noted that if total statistics are looked at then Resource 1 would be picked as it has the least allocated slices Need to check to make sure that the total statistics are not going unbalanced in an unacceptable way Since the total statistics are allowed to go out of bounds by as much as 15, Resource 2 statistics are made better by 15 and then compared.

Resource 2 statistics are now 84 (99-15). Remember, looking for the least allocated so subtracting boost gives us a better answer.

Resource 1 has an 86 and Resource 2 has an adjusted total value of 84. Resource 2 is still the best as 84 is less than 86. Thus, Resource 2 is the best resource.

Example 2

| | Class Resource Allocation Statistics | | | Total Resource AllocationStatistics | |
|---|---|---|---|---|---|
| Resource 1 | Class A | 1 | Allocated | 1 |
| | Class B | 0 | Free | 99 |
| | Free | 99 | | |
| Resource 2 | Class A | 0 | Allocated | 99 |
| | Class B | 99 | Free | 1 |
| | Free | 1 | | |

In this example, a best system resource is required to be selected in connection with a Class A slice. Further, a performance policy is deployed.

Select a resource based on the class statistics: Resource 2 has 0 Class A allocated slices and Resource 1 has 1 allocated slice so we select Resource 2 as it has the least allocated Class A slices. It should be noted that if total statistics were considered, Resource 1 would be selected as it has the least allocated slices Need to check to make sure that the total statistics are not going unbalanced in an unacceptable way In this embodiment the boost is 15 so the total statistics are allowed to go out of bounds by as much as 15. As a result, Resource 2 statistics are made better by 15 and then compared.

Resource 2 statistics are now 84 (99-15). Remember, looking for the least allocated so subtracting boost gives us a better answer.

Resource 2 is not better than Resource 1 statistics resulting in an imbalance so the initial selection of Resource 2 is overridden and Resource 1 is considered a better resource.

While the above description describes a performance policy, it should be understood that other policies may also be utilized. For example, an energy-saving green policy that seeks to use the most utilized non-full resource. If the green policy were deployed, the adjustment as describe above would add the pre-determined amount to the first value and the subsequent comparison would seek the greater of the adjusted value and second value. Of course, in either policy, the actual calculation would never let the value go less than 0 or more than the maximum allowable value of the resource.

Although not described above, it should be further noted that a client can specify which resource that it prefers to have, such as, specifying the RAID group wanted. This preference can then be used in lieu of the selection of the best resource based on the said first evaluation, and then this resource, along with its boost, can be compared with the best resource based on the second evaluation.

Returning to FIGS. 1A and 1B, it should also be noted that resource manager 114 may include interfaces for performing a variety of tasks, such as adding or removing resource collections to the set of resource collections about which resource manager 114 maintains information; changing the order in which resource collections are evaluated by the resource manager; adding or removing resource objects from the resource collections; changing the order of the resource objects maintained in each resource collection; and selecting a resource from within the collection. In one embodiment, the selection process walks through the list of resource objects, starting with the first two resource objects in the list, and compares the two objects to determine which object is the better of the two. The winner of the comparison—i.e., the "better" object—is then compared against the next object within the collection; this operation repeats until all objects in the collection have been subjected to a comparison operation. The object remaining after all comparisons are complete is the "best" object.

Thus, resource manager 114 may maintain a list, table, database, or other means for storing a set of collection objects 118, the number of resource collections currently maintained, information indicating the order in which the resource collections should be evaluated, or other information helpful to the selection process.

In one embodiment, the comparison operation is performed by resource manager 114, but the comparison operation is defined by the client. For example, system 100 may include a dedicated memory for holding client-created routines, in which case the comparison interface 128 may include a pointer to the memory location where resource manager 114 can expect to find the comparison function or routine. Alternatively, system 100 may include separate entities, called collection managers, which perform the comparison operation upon request from resource manager 114 and which send the results of the comparison operation back to resource manager 114. In this scenario, resource manager 114 may simply iterate through its list of resource objects, choosing two or more objects from the list, and ask the resource manager to select the best object.

In one embodiment, the selection of the best resource object in a resource collection may involve considering any dependencies or other selection criteria, including the results of a previous selection. For example, in the embodiment illustrated in FIG. 1A, each RAID group 108 may be associated with one or more buses; if the selection process first chooses the best bus, then the best RAID group, for example, once the best bus has been selected, all RAID groups not on the selected bus must be excluded from selection during the next step of the selection process, the selection of the best RAID group. If the selection policy is generally "choose a slice from the RAID group with the highest throughput", the "best" RAID group might not be simply "the highest throughput RAID group", for example, but might be "the highest throughput RAID group that is attached to the selected bus."

It will be understood that various details of the subject matter described herein may be changed without departing from the scope of the subject matter described herein. Furthermore, the foregoing description is for the purpose of illustration only, and not for the purpose of limitation.

What is claimed is:

1. A method, comprising:
    maintaining, by processing circuitry, statistics relating to slice allocation in connection with like system resources;
    receiving, by processing circuitry and from a requesting entity, a request for allocation of a resource;
    in response to receiving the request, selecting, by processing circuitry and for a particular slice class, a best system resource based on the statistics to implement a policy; and
    allocating, by processing circuitry, a slice for the particular slice class in connection with the best system resource;
    wherein selecting the best system resource, comprises:
        determining a first value in connection with a first system resource of the like system resources, wherein the first value relates to total slice allocation in connection with the first system resource;
        adjusting the first value by a pre-determined amount to produce an adjusted first value;
        determining a second value in connection with a second system resource of the like system resources, wherein the second value relates to total slice allocation in connection with the second system resource;
        comparing the adjusted first value and the second value; and
        based on the said comparison, selecting, for the particular slice class, one of the first and the second system resources as the best system resource to implement the policy.

2. The method as claimed in claim 1, further comprising allocating the best system resource.

3. The method as claimed in claim 1, wherein the statistics associated with each system resource are suitable for describing a relationship with a slice class allocation; and
    wherein selecting the best system resource comprises:
        evaluating the slice class allocation in connection with each system resource; and
        selecting the first system resource based on the said evaluation and the policy.

4. The method as claimed in claim 3, wherein the slice class allocation describes the amount of free or allocated slices for slice classes in connection with the system resource.

5. The method as claimed in claim 3, wherein the statistics associated with each system resource are suitable for describing a relationship with a total slice allocation; and
    wherein selecting the best system resource comprises:

evaluating the total slice allocation in connection with each system resource; and selecting the second system resource based on the said evaluation and the policy.

6. The method as claimed in claim 5, wherein the total slice allocation comprises the total non-class slice allocation in connection with the system resource.

7. The method as claimed in claim 1 wherein the like system resources comprise storage array resources that include any one of storage entities, system buses, and logical units, wherein the storage entities store data, the system buses transfer data to and from the storage entities, and wherein the storage entities are divided into logical units, and further wherein the logical units are divided into slices.

8. The method as claimed in claim 7, wherein each storage entity comprises one of a single storage device and a plurality of storage devices organized into a redundant array, and wherein each storage device comprises one of: a hard disk drive; a floppy disk drive; a tape drive; a solid state drive; a flash memory; and a flash drive.

9. The method as claimed in claim 8, wherein the redundant array comprises a redundant array of inexpensive disks (RAID) group.

10. The method as claimed in claim 7, wherein the statistics include at least one of: a number of slices allocated from each storage entity; a number of allocated slices associated with the buses; and a number of slices allocated from the logical units.

11. The method as claimed in claim 1, wherein the like system resources are arranged in a system resource collection that is one of a set of system resource collections of like system resources;

and further wherein the method comprises providing a resource manager for receiving the request, evaluating the collections, and selecting the best resource from each collection.

12. The method as claimed in claim 11, wherein the method further comprises providing a collection manager for managing a collection of resources and for receiving, from the resource manager, requests to evaluate resources within the managed collection and indicate to the resource manager the best resource within the managed collection.

13. A system, comprising:

at least one processing device, said at least one processing device comprising a processor coupled to a memory;

wherein the system is configured to:

maintain statistics relating to slice allocation in connection with like system resources;

receive, from a requesting entity, a request for allocation of a resource;

in response to receiving the request, select, for a particular slice class, a best system resource based on the statistics to implement a policy; and allocate a slice for the particular slice class in connection with the best system resource;

wherein selecting the best system resource, comprises:

determining a first value in connection with a first system resource of the like system resources, wherein the first value relates to total slice allocation in connection with the first system resource;

adjusting the first value by a pre-determined amount to produce an adjusted first value;

determining a second value in connection with a second system resource of the like system resources, wherein the second value relates to total slice allocation in connection with the second system resource;

comparing the adjusted first value and the second value; and based on the said comparison, selecting, for the particular slice class, one of the first and the second system resources as the best system resource to implement the policy.

14. A non-transitory computer readable medium having stored thereon computer executable instructions that when executed by a processor of a computer perform steps comprising:

maintaining statistics relating to slice allocation in connection with like system resources;

receiving, from a requesting entity, a request for allocation of a resource;

in response to receiving the request, selecting, for a particular slice class, a best system resource based on the statistics to implement a policy; and allocating a slice for the particular slice class in connection with the best system resource;

wherein selecting the best system resource, comprises:

determining a first value in connection with a first system resource of the like system resources, wherein the first value relates to total slice allocation in connection with the first system resource;

adjusting the first value by a ore-determined amount to produce an adjusted first value;

determining a second value in connection with a second system resource of the like system resources, wherein the second value relates to total slice allocation in connection with the second system resource;

comparing the adjusted first value and the second value; and based on the said comparison, selecting, for the particular slice class, one of the first and the second system resources as the best system resource to implement the policy.

* * * * *